United States Patent [19]

Mueller

[11] 4,094,930

[45] June 13, 1978

[54] MOISTURIZED AIR-FILTER FOR INTERNAL COMBUSTION ENGINES

[76] Inventor: Henry F. W. Mueller, P.O. Box 524, 901 Edgar St., Yoakum, Tex. 77995

[21] Appl. No.: 768,166

[22] Filed: Feb. 14, 1977

[51] Int. Cl.² ............................................. F02M 25/02
[52] U.S. Cl. ..................................... 261/18 A; 55/256; 55/DIG. 27; 261/123
[58] Field of Search ............... 55/256, 255, 249, 95, 55/DIG. 27, 244, 239; 261/123, 120, 18 A

[56] References Cited

U.S. PATENT DOCUMENTS

| | | | |
|---|---|---|---|
| 1,421,432 | 7/1922 | Embanks | 55/256 |
| 1,452,231 | 4/1923 | Wells | 261/18 A |
| 1,790,991 | 2/1931 | Marquette | 261/18 A |
| 1,842,663 | 1/1932 | Ellis | 55/249 |
| 2,491,645 | 12/1949 | Clark et al. | 55/249 |
| 2,745,646 | 5/1956 | Stultz | 55/256 |
| 2,954,095 | 9/1960 | Brock | 55/255 |
| 3,504,481 | 4/1970 | Zakarian et al. | 55/256 |
| 3,563,029 | 2/1971 | Lowes | 55/239 |
| 3,980,080 | 9/1976 | Muto | 55/244 |

FOREIGN PATENT DOCUMENTS

| | | | |
|---|---|---|---|
| 760,777 | 6/1967 | Canada | 55/256 |
| 637,480 | 5/1950 | United Kingdom | 55/255 |

*Primary Examiner*—Tim R. Miles
*Attorney, Agent, or Firm*—Pravel, Wilson & Gambrell

[57] ABSTRACT

A new and improved apparatus for adding moisture to the air supplied to the air intake of an internal combustion engine, wherein a container means chamber is partially filled with a water supply leaving an air passageway thereabove and including an air inlet means for directing a first predetermined portion of incoming air into the water and a second predetermined portion into the passageway above the water to create turbulence in the water to facilitate adding moisture to the air as it flows in the passageway and is thereafter discharged to an engine intake.

10 Claims, 3 Drawing Figures

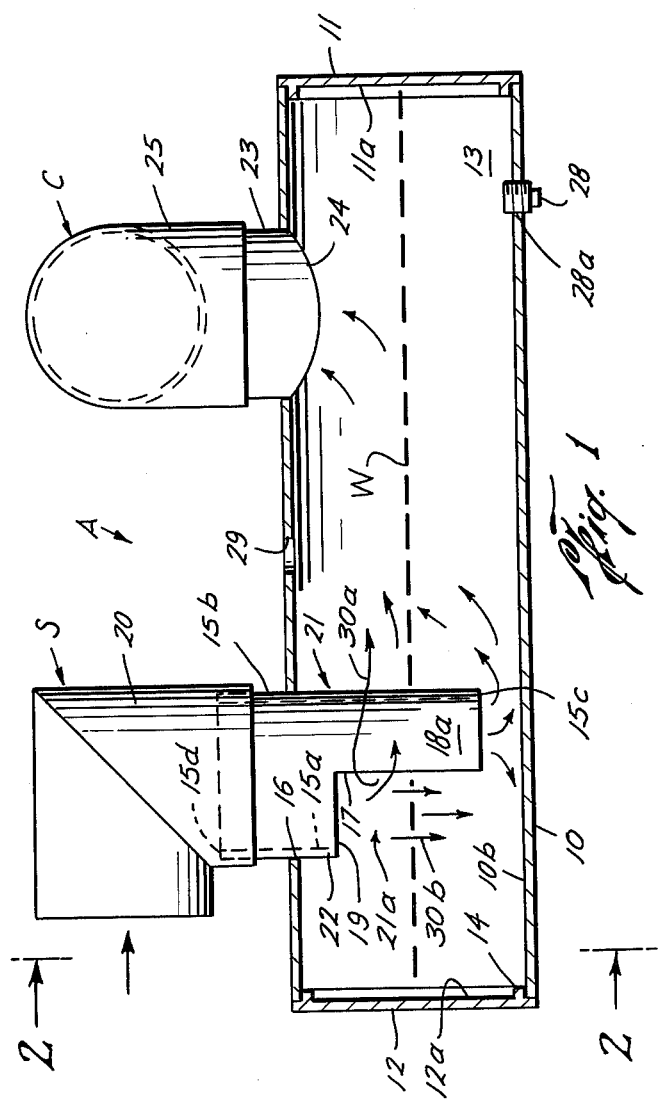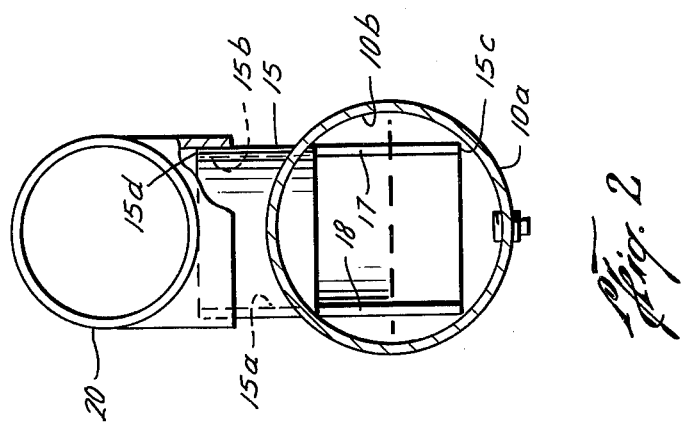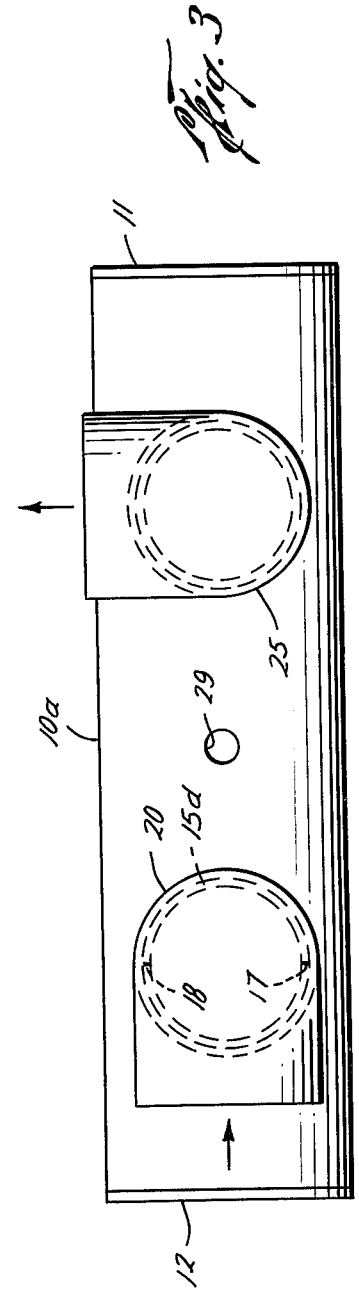

MOISTURIZED AIR-FILTER FOR INTERNAL COMBUSTION ENGINES

BACKGROUND OF THE INVENTION

This invention relates generally to the field of engine air humidifiers which moisturize and remove impurities from the air supplied to a carburetor or other air intake of an internal combustion engine.

It is well-known in the prior art that water vapor supplied to the combustion chamber of an internal combustion engine increases efficiency and economy of operation. Numerous apparatuses have been proposed for moisturizing gases directed to an air intake manifold of an internal combustion engine. Known U.S. Pat. Nos. directed to such apparatuses are as follows: 1,746,380; 2,067,221; 2,431,679; 2,954,967; 3,107,657; 3,615,074. It is also well-known that a liquid bath may be used to remove particulate matter from air which is directed to a carburetor intake. Such air cleaners typically may use oil or water when it is desired to also add moisture to the cleaned air. Known U.S. patents involving the use of a water bath to clean and humidify air are as follows: U.S. Pat. Nos. 1,661,540; 1,684,757; 2,669,319.

So far as is known, the prior art apparatuses for cleaning and humidifying air for a carburetor intake include specially designed structures which vary in complexity but generally involve numerous parts manufactured with special tools which makes these apparatuses relatively expensive. Such known prior art apparatuses also may not be readily adaptable for adding to different types of internal combustion engines which were not initially manufactured for their use. Some devices direct the air totally into a water bath so that the air bubbles up through the water to pick up moisture. Other devices merely inject air above the water level so that the air merely comes into limited contact with the water surface.

SUMMARY OF THE INVENTION

This invention relates to a new and improved apparatus for adding moisture to the air supplied to a carburetor intake of an internal combustion engine.

In the preferred embodiment of this invention, a closed end, elongated tubular container means forms a chamber for holding a water supply with an air space passageway above the water supply. A discharge means mounted with the container communicates with the air space passageway for supplying the cleaned and moisturized air to the engine air intake. An air inlet means including a baffle means which blocks a substantial portion of the air passageway is mounted at an opposed end of the container means from the discharge means. A first predetermined portion of the incoming air through the air inlet means is directed into the water to create turbulence in the water while a second portion is directed to the passageway, which facilitates adding moisture to the air. The first portion of moisturized air is combined with the remaining second portion of air for discharge from the apparatus to an air intake of an internal combustion engine.

BRIEF DESCRIPTION OF THE DRAWINGS

FIG. 1 is a side elevation view of the new and improved apparatus;

FIG. 2 is a cross-section taken along line 2—2 in FIG. 1; and,

FIG. 3 is a plan view of the new and improved apparatus.

DESCRIPTION OF THE PREFERRED EMBODIMENTS

In the drawings, the letter A generally designates the new and improved apparatus of this invention. The apparatus A includes an elongated container means which includes an elongated cylindrical tubular member 10 having an outer wall surface 10a and an inner wall surface 10b. The cylindrical tubular member 10 is preferably formed of PVC pipe which may, for instance, have an inside diameter in the order of 6 inches. The length of the tubular member 10 as well as the diameter varies according to the particular requirements for each installation. A The typical length for 6 inches inside diameter PVC pipe might be 18 to 24 inches. End closure means 11 and 12 enclose opposite ends of the tubular member 10 forming a chamber therein. End closure means 11 and 12 may be cylindrical and include lip portions 13 and 14, respectively, which lip portions help secure the end closure means with the tubular member and also help in forming a seal therewith. Interior surfaces 11a and 12a of the end closure means and the inner wall surface 10b define the elongated chamber of the container means of the apparatus.

Secured at one end of the tubular member is an air inlet means generally designated S. The air inlet means includes a tubular member 15 having an air passageway therethrough defined by interior surface 15a. The air supply tubular member 15 extends into an opening defined by the interior wall surface 16 in the upper part of the cylindrical tubular member 10. The outer wall of the tubular member 15 as defined by the outer surface 15b has substantially the same size as the opening defined by the inner wall surface 16 in the cylindrical tubular member 10. A suitable sealing adhesive or solvent is used where the inner wall surface 16 contacts the outer surface 15b of the tubular member 15 to provide a sealing connection therewith. The lower end of the tubular member 15 as defined by the wall end surface 15c forming channel 18a contacts the inner wall surface 10b of the cylindrical tubular member 10 as shown in FIG. 2. This contact facilitates a rigid securement of the tubular member with the cylindrical tubular member 10. The lower portion of the tubular member 15 is notched out or removed with the removed portion having a cross-section which is generally semicircular. The notched out portion is defined by vertical wall surfaces 17 and 18 and by horizontal wall surface 19. The horizontal wall surface 19 extends just below the lowermost portion of the inner wall surface 16 of the opening in the cylindrical tubular member 10. This horizontal wall surface 19 also extends above the horizontal centerline of the cylindrical tubular member 10 as best shown in FIG. 2. The tubular member 15 extends above the outer wall surface 10a of the cylindrical tubular member 10 a distance which is defined by the upper wall end surface 15d. Secured with the upper end of the tubular member 15 is a 90° elbow 20 which is sealingly secured with the tubular member 15 with a suitable adhesive or solvent. Air is supplied to the elbow 20 for conducting through member 15 and into the chamber of the apparatus A for conducting to an intake of an internal combustion engine as explained more fully hereinafter. The air supplied to the elbow 20 may be supplied from a fan to provide adequate air flow into the apparatus A. Such air may be supplied from a conventional cooling fan of an internal combustion engine with suitable tubing extending from the elbow 20 to the proximity of the radiator so as to receive air from the radiator which has increased velocity from the fan and which to a certain extent is preheated. Suitable PVC pipe and connections (not shown) could extend from the elbow 20 to receive the air from the engine fan which air has already passed through the radiator. The tubular member 15 may be fabricated from PVC pipe which typically may have an inside diameter of 4 inches so that it may easily be inserted into the tubular member 10 which has a relatively larger inside diameter.

The chamber within the tubular member 10 holds a water supply designated W which typically may fill in the order of one-half of the chamber. In such a case, it will be apparent that the wall end surface 15c will extend into the water supply W with the horizontal wall surface 19 just below the lowermost portion of the inner wall surface 16 along the side of the tubular member 10. As best shown in FIG. 2, the baffle means which comprises the portion of the tubular member 15 which lies within the inner wall surface 10b blocks a substantial portion of the chamber and in particular blocks a substantial portion of the air passageway above the water supply W. The baffle means preferably blocks at least one-half of the chamber cross-sectional area and when the chamber is filled with water as discussed above, the baffle means may block at least 80% of the air passageway cross-sectional area. The portion of the baffle means between the water level when the tubular member 10 is half full of water and the horizontal wall surface 19 includes at least one-half of the portion of the baffle means blocking the air passageway and preferably is greater than one-half. As shown in FIG. 2, a first portion of the air entering the elbow 20 travels directly downwardly through the tubular member 15 so as to impinge upon the water surface in front of the semicircular notched portion 21a so that some of the air enters the water as shown by the arrows 30b in FIG. 1 which creates turbulence in the water creating bubbles with the contact of the air with the water resulting in the addition of water vapor to the air. The partial blocking of the air passageway is important to create the turbulence in the water to the left of the notched portion 21 as shown in FIG. 1. The smaller the area of the removed portion of the member 15 defined by the surfaces 17, 18 and 19, the more turbulence is created since the air velocity increases with a fixed amount of incoming air and more incoming air is passed into the water supply W. The distance from the wall surface 19 to the water surface as well as the amount of the notched out portion may be decreased to create more turbulence in the water from the increased velocity of the air through the smaller opening formed thereby. Also, a flat vertical closure plate may be secured between the vertical wall surfaces 17, 18 and end surfaces 19 and 15c (FIG. 1) to increase the turbulence by injecting more of the incoming air into the water. This will facilitate adding more moisture to the air as well as removing more particulate matter. Also, the diameter of the tubular member 15 can be varied, such as by decreasing it to increase the turbulence caused by increased velocity of the incoming air into the intake.

A second portion of the incoming air moves directly through the space at each side of the tubular member 15 as shown by the arrows 30a in FIG. 1, defined by the tubular member and the inside wall surface 10b, without entering the water supply W and is mixed with the other portion of the incoming air which was directed downwardly into the water to create the turbulence to increase moisture pick-up. The second portion may pick up some moisture through its contact with the upper surface of the water W although not as much as that which results from the turbulence caused by the first portion. This provides somes control of the amount of moisture added to the incoming air since the shape and dimensions of the intake means are determined to provide the desired amount of turbulence and first portion of air injected into the water.

Accordingly, the amount of incoming air can be divided between the first and second predetermined portions according to the particular needs of a particular engine. The optimal amount of moisture to be added to the incoming air can be determined by those skilled in the art and may vary depending on such variables as atmospheric humidity, fuel and type of engine. The intake means S provides a simple and effective mechanism to regulate the mount of moisture added to the incoming air. The mixture of moisturized air is discharged from the apparatus as a remote area from the intake by placing the intake and discharge at opposite ends of the container.

At the opposite end of the tubular member 10 from the air inlet or intake means S is a discharge means C which includes a tubular member 23 which communicates with the air passageway above the water supply or bath and is sealingly connected with an opening in the upper surface of the tubular member as defined by inner wall surface 24. The tubular member 23 is preferably formed of PVC pipe having a 4 inch inner diameter as is the tubular member 15 of the air supply means S. A suitable sealing adhesive or solvent is used to secure the tubular member 23 with the opening in the tubular member 10.

A 90° elbow 25 is secured to the upper end of the tubular member 23 and a horizontal tubular member may be secured with the elbow 25. An additional elbow may be secured to the horizontal tubular member. The additional elbow may communicate with the air intake of a carburetor or the like of an internal combustion engine for supplying air which has moisture added thereto as well as particulate matter removed. Although reference is made to the air intake of a carburetor, it is understood that the apparatus of this invention would be equally applicable to an engine having fuel injection or other type of injection means since such internal combustion engines use air to burn with the fuel.

A plug means 28 is screwed into a threaded opening 28a in the bottom of the tubular member 10. Another opening in the upper portion of the tubular member is defined by the inner wall surface 29 which may likewise be threaded or have some other type of removable plug for insertion therein. Water may be added to the tubular member 10 through the opening defined by inner wall surface 29 and the water therein may be drained through the lower opening by removal of the plug means 28. Some water will be depleted from the tubular member 10 during operation once after it has been previously filled to approximately the half mark due to evaporation and water vapor being added to the air coming into the air supply means exiting the connector means C. Also, particulate matter will tend to settle in the bottom portion of the container member and will, accordingly, periodically require removal by flushing the inner chamber of the tubular member 10 with the plug means 28 removed so as to wash the particulate matter out of the chamber.

OPERATION

In operation, the apparatus A is connected with the housing, frame or the like, of an internal combustion engine or may even be mounted directly upon the engine. The air intake means S has its opening located to receive air preferably from the fan or in the case of automotive vehicles pointed in the direction of travel. Suitable tubular members or connectors may be provided to conduct air to the air supply means and from the connector means C to an air intake means. With the plug means 28 installed, water is added to the upper opening so as to fill the chamber of the tubular member 10 at approximately the half-way mark. Upon starting of the internal combustion engine, air will be drawn into the air intake means and a predetermined portion thereof directed into the water to the left of the baffle 21 causing turbulence in the water which picks up water vapor as the air travels around the baffle means through the air passageway above the water supply and out the connector means C. A second predetermined portion will pass around the baffle 21 and through the passageway above the water to be mixed with the moisturized air which was directed into the water supply. The division of the first and second portions of the air intake is predetermined by the size and dimensions of the notched out portion of the tubular member 15 and by whether a closure plate (not shown) is added to form the channel 18a as explained above to inject more incoming air into the water supply to increase the amount of moisture in the air discharged by discharge means C. During the travel of the air through the air passageway, some particulate matter in the air will be transferred to the water and will ultimately settle to the bottom or lower portion of the inner wall surface 10b. The air exhausting the tubular member 10 will have moisture added thereto for more efficient operation of the internal combustion engine and have substantially all particulate matter removed for protection of the engine. The size of the tubular member 10 may be varied according to the needs of the internal combustion engine to provide adequate cleaning and humidifying of the air used by the engine. However, preferably readily available materials such as PVC pipe will be used so that the apparatus of this invention can be manufactured at a very low cost.

After a predetermined time period which may depend on the operating conditions, the plug 28 is removed and the settled particulate matter in the water supply in the tubular member 10 is washed out, or flushed. The plug 28 is then reinserted and an additional amount of water is added to the chamber to the upper opening. Water may be added to the chamber between flushing to replenish the water loss to evaporation caused by the incoming air creating the turbulence of the water. As with flushing, the addition of water can usually be predicted or estimated by the particular type of operation.

The foregoing disclosure and description of the invention are illustrative and explanatory thereof, and various changes in the size, shape and materials as well as in the details of the illustrated construction may be made without departing from the spirit of the invention.

What is claimed is:

1. An apparatus for moisturizing air for an air intake of an internal combustion engine, comprising:
    container means forming a chamber holding a quantity of water to only partially fill same so as to leave an air passageway above the water;
    air inlet means for admitting air into the container means at one area thereof and communicating with the air passageway;
    discharge means for discharging air from an area of the container means remote from said inlet means and communicating with the air passageway for conveying moisturized air from the chamber to an internal combustion engine air intake;
    said air inlet means comprising a tubular member, sealingly secured to an opening in the container means, with a portion thereof extending internal to the container means; and
    said portion internal to the container means having a semi-tubular portion removed on a side which is opposite to the discharge means thereby forming a substantially horizontal wall surface which is below the opening, at its lowermost point, in the container means and a remaining semi-tubular portion which extends substantially below the water surface in such a manner as to partially segregate the container means into two areas and forming a passageway below the water surface permitting communication between said areas of the container means.
2. The apparatus as set forth in claim 1, wherein:
    the air inlet means blocks at least one-half of the chamber cross-sectional area.
3. The apparatus as set forth in claim 1, wherein:
    said air inlet means includes a baffle means for blocking at least eighty percent of the air passageway cross-sectional area.
4. The apparatus as set forth in claim 1, wherein:
    the air inlet means having an opening therein of predetermined size communicating with the air passageway to create a desired amount of turbulence.
5. The apparatus as set forth in claim 1, wherein:
    the discharge means, connector means and air inlet means are formed of PVC pipe.
6. The apparatus as set forth in claim 1, wherein:
    the container means comprises an elongated chamber.
7. The apparatus as set forth in claim 6, wherein:
    the elongated chamber is formed by a closed end cylindrical tubular member.
8. The apparatus as set forth in claim 1 wherein:
    the air inlet means comprises a cylindrical tubular member sealingly secured to an opening in the container means.
9. The apparatus as set forth in claim 8, wherein:
    the air inlet means tubular member having a removed portion with the remaining portion forming a portion of a baffle means extending into the water supply and partially blocking the air passageway.
10. The apparatus as set forth in claim 9, wherein:
    the remaining portion of the baffle means is semi-circular in cross-section.

* * * * *